United States Patent [19]

Spivey, Jr.

[11] 4,182,125
[45] Jan. 8, 1980

[54] CONTROL CIRCUIT FOR VARIABLE DISPLACEMENT PUMP WITH VENTURI BYPASS CONTROL

[75] Inventor: William J. Spivey, Jr., Joliet, Ill.

[73] Assignee: Caterpillar Tractor Co., Peoria, Ill.

[21] Appl. No.: 945,748

[22] Filed: Sep. 25, 1978

[51] Int. Cl.$^2$ .................... F16D 31/02; F15B 21/04
[52] U.S. Cl. ............................... 60/431; 60/445; 60/456; 60/464; 60/468
[58] Field of Search ............... 60/431, 444, 445, 456, 60/464, 468

[56] References Cited

U.S. PATENT DOCUMENTS

| | | | |
|---|---|---|---|
| 3,727,628 | 4/1973 | Habiger et al. | 60/445 X |
| 3,996,743 | 12/1976 | Habiger et al. | 60/431 |
| 4,094,145 | 6/1978 | Habiger | 60/447 |

Primary Examiner—Edgar W. Geoghegan
Attorney, Agent, or Firm—Phillips, Moore, Weissenberger, Lempio & Majestic

[57] ABSTRACT

A control circuit (10) for the variable displacement pump (18) of a hydrostatic transmission (16) or the like comprises an underspeed actuator (31) connected to the servo system (19) of the pump (18), a venturi (15) interconnected between a source of pressurized working fluid (11) and the pump (18) and a pressure regulating valve (36) interconnected between a downstream side of the venturi (15) and the pump (18). A throat (29) and upstream side of the venturi (15) are connected to the underspeed actuator (31) for communicating a differential fluid pressure signal thereto to automatically control the displacement of the pump (18) under certain operating conditions of an engine of a vehicle. This invention is directed to a bypass arrangement (39) interconnected between a downstream side of the pressure regulating valve (36) and the upstream side of the venturi (15) to closely control the fluid pressure drop across the venturi (15) and to compensate for changes in the temperature of the pressurized working fluid passing through the venturi (15).

7 Claims, 3 Drawing Figures

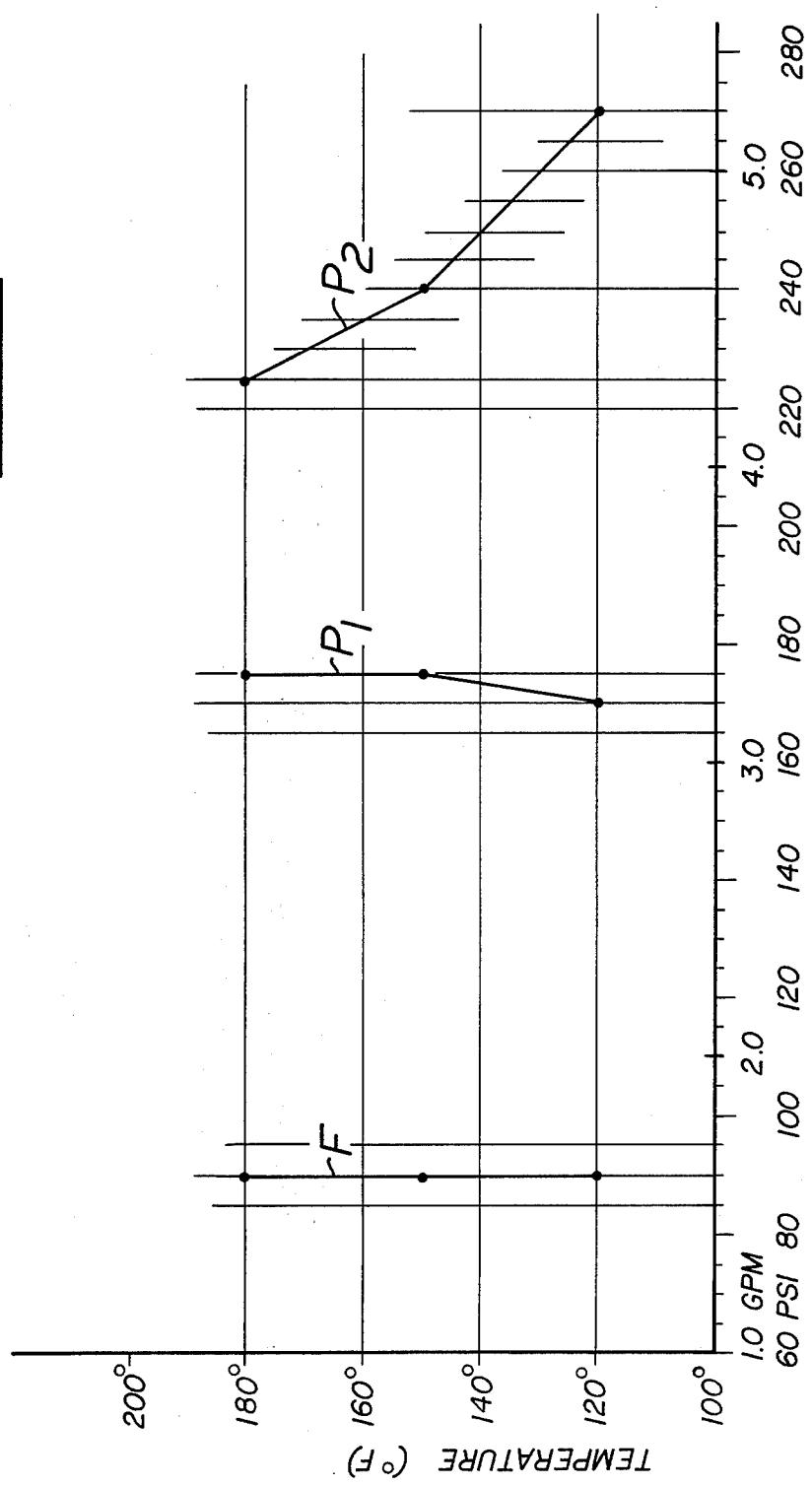

CONTROL CIRCUIT FOR VARIABLE DISPLACEMENT PUMP WITH VENTURI BYPASS CONTROL

TECHNICAL FIELD

This invention relates to a control circuit for the pumps of a hydrostatic transmission or the like wherein an adjustable orifice means is connected in the control circuit to closely calibrate and adjust a fluid pressure drop across a venturi which generates a fluid pressure signal for automatically controlling displacement of the pumps under certain operating conditions of an engine.

Hydrostatic transmissions include variable displacement pumps adapted to have the displacements thereof varied between minimum and maximum levels upon adjustment of servo systems connected to the pumps. U.S. Pat. Nos. 3,996,743 and 4,094,145, issued on Dec. 14, 1976 and June 13, 1978, respectively, to Cyril W. Habiger, disclose conventional control circuits for controlling the displacement of pumps of this type.

The latter patent, for example, discloses a control circuit wherein an underspeed actuator is connected to the servo systems of the pumps and is further connected to a venturi to receive a differential fluid pressure signal therefrom which is proportional to the speed of a vehicle's engine to automatically control the underspeed actuator for automatically varying the displacement of the pumps under certain conditions of engine operation. A pressure regulating valve is connected to a downstream side of the venturi and a variable orifice of a bypass arrangement is connected between the venturi and pressure regulating valve and to an upstream side of the venturi to adjust the pressure drop across the venturi.

This adjustment is desirable to fine tune the above-mentioned differential fluid pressure signal to compensate for manufacturing variances in the venturi, springs of the underspeed actuator and control pumps of the circuit. The bypass arrangement, incorporating the variable orifice therein, has been found to be highly sensitive to temperature changes of the pressurized working fluid or oil flowing through the venturi, e.g., an approximate 10 psi shift in venturi output signal per 100° F. change in oil temperature. An increase in oil temperature will, of course, decrease the viscosity of the oil to thus decrease the pressure drop through the venturi. Since the bypass arrangement is connected adjacent to the downstream side of the venturi, the pressure drop across the venturi is quite low (e.g., 100 psi) whereby any change in such pressure drop will adversely affect and cause a proportionate change in the differential pressure constituting the above-mentioned fluid pressure signal.

In essence, this invention provides an improved bypass arrangement of the above type which will assure a minimal change in the fluid pressure signal even though the temperature of the working fluid or oil varies substantially.

DISCLOSURE OF THE INVENTION

The present invention is directed to overcoming one or more of the problems as set forth above.

This invention constitutes an improved bypass means employed in a control circuit comprising a source of pressurized fluid, variable displacement pump means for having the displacement of a pump thereof varied in response to communication of pressurized fluid thereto, an underspeed actuator connected to a servo system of the pump means to automatically control the displacement of the pump, a venturi connected between the source and the pump means and having a throat and upstream side thereof connected to the underspeed actuator for communicating a differential fluid pressure signal thereto for automatically controlling the displacement of the pump and a pressure regulating valve interconnected between a downstream side of the venturi and the pump means. The improvement constituting this invention resides in the connection of the bypass means between a downstream side of the pressure regulating valve and the upstream side of the venturi for controlling the fluid pressure drop across the venturi to, in turn, control the above-mentioned fluid pressure signal.

Such bypass means will thus provide a substantially large pressure drop across the bypass arrangement whereby the fluid pressure signal across the venturi will be substantially insensitive to variations in the temperature of the working fluid to insure efficient operation of the pump means.

BRIEF DESCRIPTION OF THE DRAWINGS

Other objects of this invention will become apparent from the following description and accompanying drawings wherein:

FIG. 2 graphically depicts operational characteristics of a control circuit having a conventional bypass arrangement incorporated therein.

BEST MODE FOR CARRYING OUT THE INVENTION

Figure 1:
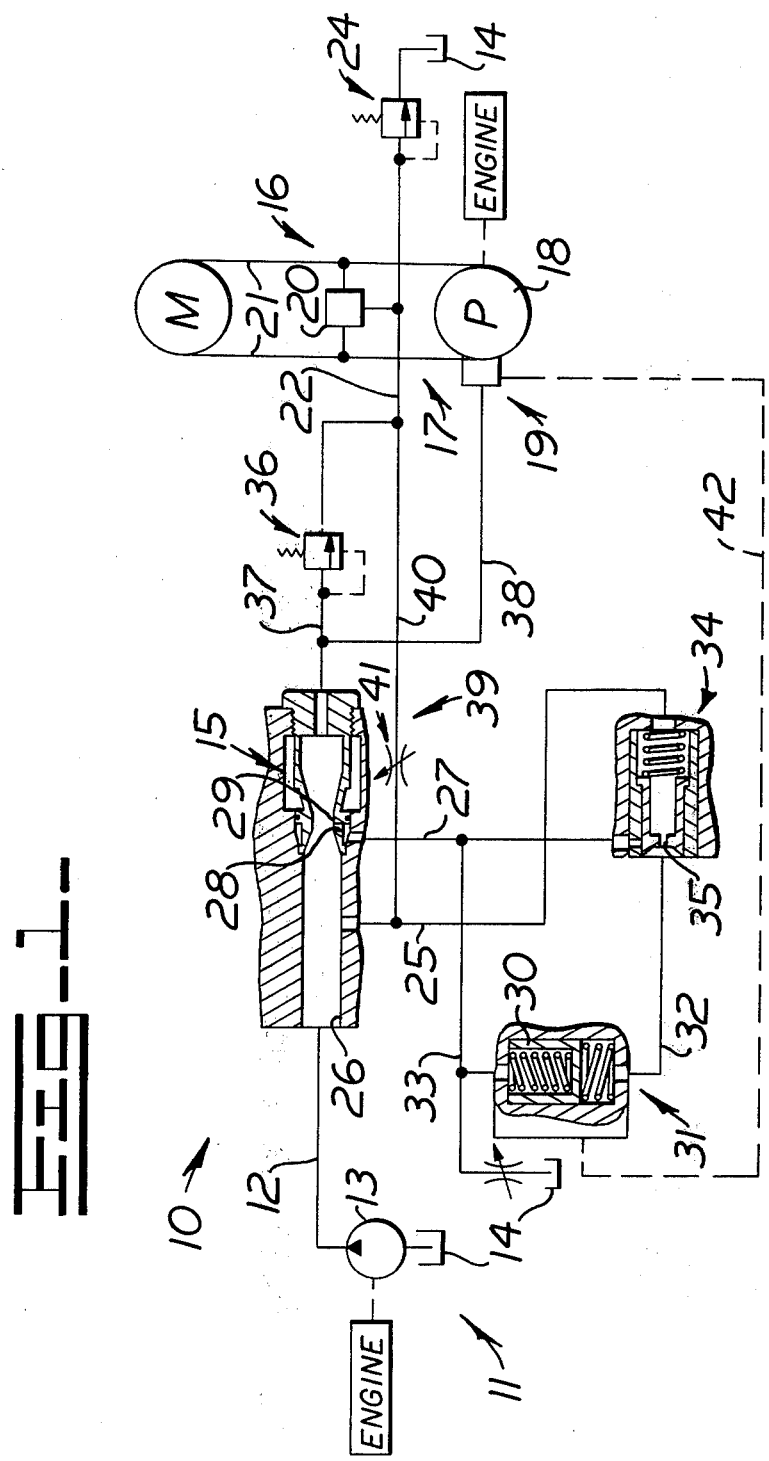
FIG. 1 schematically illustrates a control circuit embodiment of the present invention with portions thereof broken away for clarification purposes.

FIG. 1 partially illustrates a control circuit 10 wherein a pressurized fluid source 11 is adapted to charge an inlet line 12 of the circuit with pressurized fluid (hydraulic oil). As shown, the source preferably comprises an engine-driven positive displacement pump 13 suitably connected to a common reservoir or tank 14 of the circuit. When the system is in its "run" condition of operation, pressurized fluid from line 12 will flow through a venturi 15 and to a hydrostatic transmission package 16.

Hydrostatic transmission package 16 comprises a pump means 17 which includes a variable displacement pump 18, a servo system 19 and a replenishing valve 20 of conventional design. Valve 20 is interconnected between a closed loop 21 and a line 22 with loop 21 being interconnected between pump 18 and a motor "M" in a conventional manner, as more extensively discussed in above-referenced U.S. Pat. Nos. 3,996,743 and 4,094,145. A charge relief valve 24 is suitably connected to line 22 to maintain a predetermined pressure level in the line, e.g., 150 psi, to continuously charge valve 20 therewith.

As further shown in FIG. 1, flow of fluid through venturi 15 will create a differential pressure or signal between a line 25, connected to an inlet 26 on the upstream side of venturi 15, and a line 27 connected via a passage 28 to a throat 29 of the venturi. This differential pressure will be communicated to either end of a spring-biased piston 30 of an underspeed actuator 31, via lines 32 and 33. Line 25 is connected to line 32 through a quick response or shunt valve 34 which functions in a conventional manner during normal operation of the control circuit to regulate servo system 19 of pump means 17 to, in turn, control the displacement of pump 18.

In particular, shunt valve 34 normally functions to interconnect lines 25 and 32 via an orifice 35 thereof and is adapted to open to communicate line 32 with lines 27 and 33 when piston 30 of underspeed actuator 31 moves downwardly quickly to create a pressure surge in line 32. Shunt valve 34, although desirable and not forming a part of this invention, per se, could be eliminated from the control circuit which would remain fully operational.

A pressure regulating valve 36 is connected in a line 37, on a downstream side of venturi 15, to supply fluid at a predetermined pressure level (e.g., 350 psi) to line 37 and connects with replenishing valve 20 of transmission package 16. It should be further noted that a line 38 is interconnected between line 37 and servo system 19 to communicate fluid at a predetermined pressure level (e.g., 350 psi) to the servo system in a conventional manner.

A bypass arrangement 39 comprises a line 40 interconnected between line 22 on a downstream side of valve 36 and line 25 which is connected to an upstream side of venturi 15. The bypass arrangement further comprises a variable orifice 41 connected in line 40 which may be preadjusted to control the pressure drop across the venturi. Adjustment of variable orifice 41 will compensate for various manufacturing variances, such as those that may occur in the control pumps, venturi 15 and the springs of underspeed actuator 31.

In a conventional control circuit, such as that disclosed in above-referenced U.S. Pat. No. 4,094,145, line 40 would be connected to line 37, between the downstream side of venturi 15 and valve 36. As shown in FIG. 2, such a connection may result in a pressure curve $P_1$ which represents the differential fluid pressure signal between lines 25 and 27 relative to the temperature change of the oil, utilized for controlling the operation of underspeed actuator 31. Curve $P_2$ represents the differential pressure across the upstream and downstream sides of venturi 15 and across a variable orifice corresponding to variable orifice 41 whereas curve F represents the flow rate through the orifice. In plotting these curves, it is assumed that the variable orifice of the conventional bypass arrangement is set to bypass fluid therethrough at a rate of 1.6 gpm and that the engine is running at 2,024 rpm.

In can thus be seen that as the temperature of the fluid increases, curve $P_1$ becomes irratic and will increase from approximately 170 psi to 180 psi upon increase of the temperature of the fluid from 120° F. to 180° F. It can be further seen that upon such a temperature increase of the fluid that the differential pressure across venturi 15 ($P_2$) will decrease from approximately 90 psi to 60 psi and that the flow rate through the variable orifice will decrease from approximately 1.6 gpm to 1.3 gpm.

Figure 3:
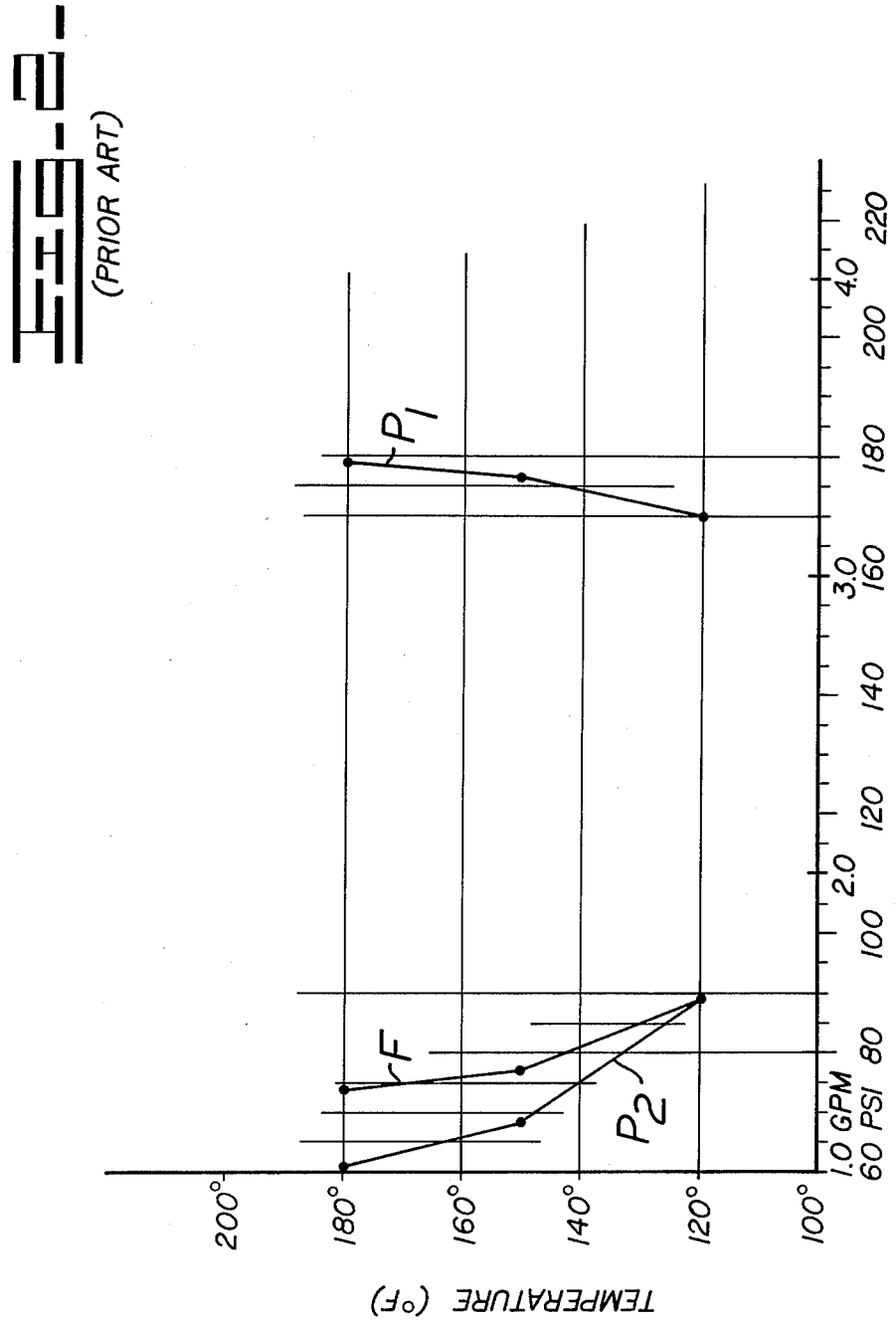
FIG. 3 is a graphical representation similar to FIG. 2, but illustrating operational characteristics of a control circuit employing the bypass arrangement of this invention therein.

FIG. 2 should now be compared with FIG. 3 which illustrates similar curves representing operational characteristics of this invention, wherein line 40 is connected to a downstream side of relief valve 36. In particular, the differential fluid pressure signal for controlling underspeed actuator 31 is reflected by curve $P_1$ which remains approximately constant (within the range of from 170 psi to 175 psi) when the temperature of the working fluid flowing through venturi 15 increases from 120° F. to 180° F. Also, the differential pressure $P_2$ across venturi 15 and valve 36 is substantially greater than that occasioned in the above-mentioned conventional circuit (FIG. 2) and will drop from approximately 270 psi to approximately 225 psi when the temperature of the fluid increases from 120° F. to 180° F. Furthermore, it can be seen that the flow rate through orifice 41 will remain substantially constant to closely approximate 1.6 gpm.

INDUSTRIAL APPLICABILITY

The present invention embodied by control circuit 10 of FIG. 1 is particularly adapted for use with a hydrostatic transmission 16 of the type used in construction vehicles and the like.

Upon starting of the vehicle's engine, pump 13 functions to discharge pressurized fluid to inlet 26 on the upstream side of venturi 15 at 450 psi, for example. Upon a pressure drop of approximately 100 psi through venturi 15, the fluid enters pressure regulating valve 36 which establishes a pressure level in line 37 of 350 psi, for example, which is reduced to 150 psi in line 22. Fluid pressure is supplied to servo system 19 at approximately 350 psi and to replenishing valve 20 of hydrostatic transmission 16 at approximately 150 psi, under control of charge relief valve 24, to control the displacement of pump 18 and the output of motor M. Simultaneously therewith, lines 25 and 27 will communicate a differential fluid pressure signal to either end of underspeed actuator 31, via lines 32 and 33, to control the positioning of piston 30 thereof which, in turn, controls the operation of servo system 19 via a standard mechanical linkage schematically illustrated at 42.

In general, piston 30 is movable between a first position at which the displacement of pump 18 is adjusted to its minimum and a second position at which the displacement of the pump is adjusted to its maximum. The fluid pressure signal communicated to either end of underspeed actuator 31 by lines 32 and 33 will function in a conventional manner to move the piston automatically between its first (full underspeed) and second (zero underspeed) positions in response to engine operation. Bypass orifice 41 is normally preset so that when engine speed closely approximates 50 rpm below rated engine speed (e.g., 2400 rpm), piston 30 is shifted to its second or zero underspeed position.

Referring once again to FIG. 3, it can be seen that when the vehicle is operating in relatively hot climatic conditions that the temperature of the working fluid may rise to a level as high as 180° F., for example. As discussed above with reference to FIG. 2, such a temperature rise would normally cause an approximate 10 psi shift in the fluid pressure signal of a conventional circuit for controlling the operation of underspeed actuator 31, i.e., the pressure differential across lines 25 and 27. However, as shown in FIG. 3, bypass arrangement 39 of this invention assures that such shift is held within an approximate range of 5 psi ($P_1$). Thus, the underspeed actuator will function in a substantially normal manner even though the working fluid in control circuit 10 may incur rather drastic temperature changes, depending on the working environment.

Other aspects, objects and advantages of this invention can be obtained from a study of the drawings, the disclosure and the appended claims.

What is claimed is:

1. In a control circuit (10) of the type comprising a source of pressurized fluid (11), variable displacement pump means (17) for having the displacement of a pump (18) thereof varied in response to communication of pressurized fluid thereto, an underspeed actuator (31) connected to a servo system (19) of said pump means for automatically controlling the displacement of said pump (18), a venturi (15) interconnected between said source (11) and said pump means (17) and having a throat (29) and upstream side (26) thereof connected (25,27) to said underspeed actuator (31) for communicating a differential fluid pressure signal thereto for automatically controlling the displacement of said pump (18) and a pressure regulating valve (36) interconnected between a downstream side of said venturi (15) and said pump means (17), the improvement comprising bypass means (39) interconnected between a downstream side of said pressure regulating valve (36) and the upstream side of said venturi (15) for controlling the fluid pressure drop across said venturi (15) to control said fluid pressure signal.

2. The control circuit of claim 1 wherein said source of pressurized fluid (11) comprises an engine-driven pump (13).

3. The control circuit of claim 1 further comprising a fluid motor (M) of a hydrostatic transmission (16) connected to said pump (18) to be driven thereby.

4. The control circuit of claim 3 further comprising a replenishing valve (20) connected to said pump (18) and to said motor (M) and further connected to said pressure regulating valve (36) and a charge relief valve (24) connected to said replenishing valve (20) for charging said replenishing valve (20) with a predetermined level of fluid pressure.

5. The control circuit of claim 1 wherein said fluid pressure signal ($P_1$) and the fluid pressure drop ($P_2$) across said bypass means (39) have relative pressure characteristics approximating those shown in FIG. 3 of the drawings when the temperature of said fluid increases as shown thereon.

6. The control circuit of claim 5 wherein the flow rate of said fluid through said bypass orifice means (39) at least approximately assumes flow characteristics represented by curve F in FIG. 3 of the drawings upon increase of the temperature of said fluid.

7. The control circuit of claim 1, 3 or 4 wherein said bypass means (39) comprises an adjustable orifice means (41) for selectively adjusting said fluid pressure signal.

* * * * *